Figures 1, 2:
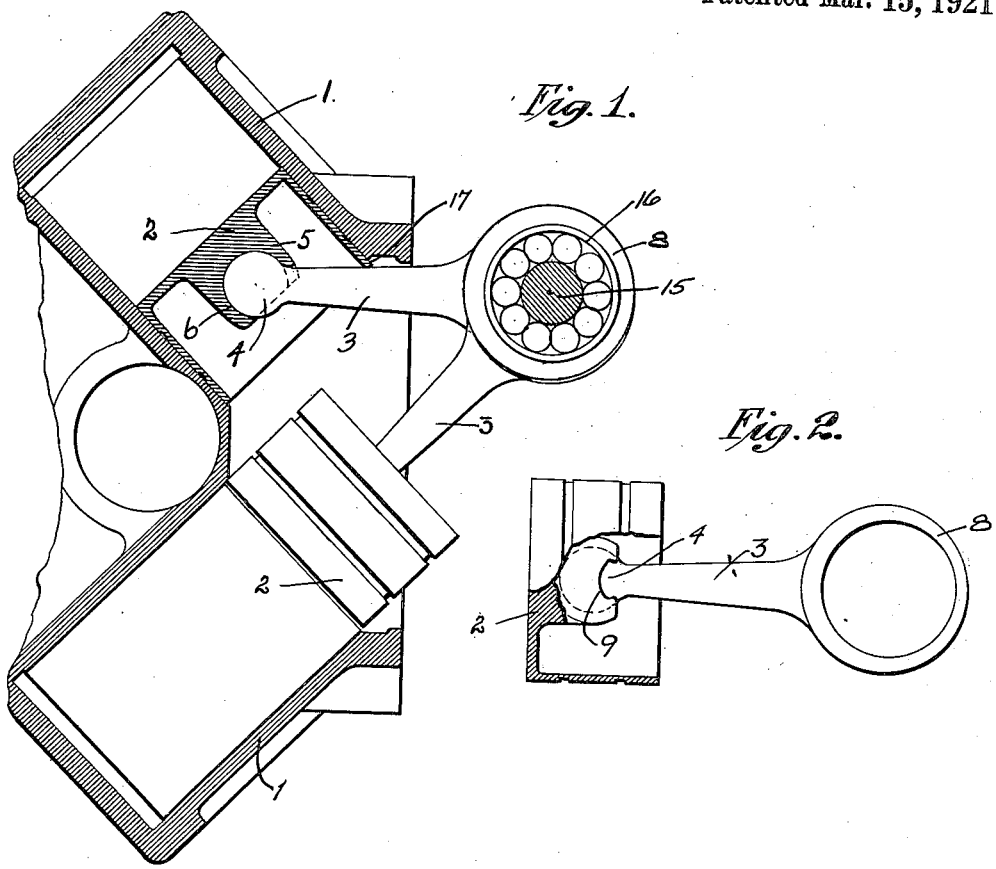

R. A. LUNDELL.
PISTON AND CONNECTING ROD CONSTRUCTION.
APPLICATION FILED APR. 18, 1918.

1,371,701.

Patented Mar. 15, 1921.

INVENTOR
R. A. Lundell
BY
Joseph H. Schofield
ATTORNEY

UNITED STATES PATENT OFFICE.

ROBERT A. LUNDELL, OF ATHENS, PENNSYLVANIA, ASSIGNOR TO INGERSOLL-RAND COMPANY, OF JERSEY CITY, NEW JERSEY, A CORPORATION OF NEW JERSEY.

PISTON AND CONNECTING-ROD CONSTRUCTION.

1,371,701.  Specification of Letters Patent.  Patented Mar. 15, 1921.

Application filed April 18, 1918. Serial No. 229,306.

*To all whom it may concern:*

Be it known that I, ROBERT A. LUNDELL, a citizen of the United States, residing at Athens, in the county of Bradford and State of Pennsylvania, have invented a certain new and useful Improvement in Piston and Connecting-Rod Constructions, of which the following is a specification.

This invention relates to engines, but more particularly to multiple cylinder V-type engines adapted to be operated by fluid under pressure as compressed air, for high speed rotating tools or machines.

In an engine of this type, the cylinders are ordinarily located at equal acute angles on opposite sides of a plane passing through the axis of the crank shaft, and the axes of the cylinders form an angle of approximately 90 degrees in practice, although this angle may be more or less than that, and between about 30 degrees and about 120 degrees as desired.

The usual method of assembling the pistons in the cylinders is to first insert the pistons and connecting rods into the cylinders, before assembling the connecting rods on the crank pin or pins of the crank shaft, necessitating some form of split or open connecting rod end, which in the limited space of small engines cannot be made as substantial and durable as a closed end one piece connecting rod, as shown in the present instance. Particularly in small engines, difficulties are experienced in so assembling the parts, owing to the confined space in which to adjust the bearings and other parts, after the pistons and connecting rods are in position in the cylinders.

The primary object of the present invention is to obviate these and other disadvantages of such methods of assembly known to those killed in the art, by forming the crank shaft, connecting rods and pistons as a single unit with provision for permitting the pistons to be inserted in the cylinders after the connecting rods have first been assembled in the pistons and on the same crank pin. By this means all the adjustments on the pistons and crank pin are conveniently made on the bench before the pistons are placed in the cylinders, and furthermore the connecting rods may be provided with continuous bearing rings adapted to be slipped over the crank endwise instead of the usual split bearings sleeves or rings which are required in the usual methods.

The invention is illustrated in the accompanying drawings in which—

Figure 1 is a longitudinal sectional view through two cylinders of a V-type engine, but transverse to the axis of the crank shaft; and Fig. 2 is a detail view of a piston and connecting rod.

Referring to the drawings, the cylinders 1 are arranged in the cylinder body with their axes at an angle of about 90 degrees in the present instance, and said cylinders as shown are located at equal acute angles on opposite sides of a plane passing through the axis of the crank, the crank pin 15 being indicated in section.

Suitable pistons 2 are adapted to operate in the cylinders and connecting rods 3 are suitably pivoted to said pistons and in accordance with this invention are adapted to be assembled on the same crank pin 15 before inserting the pistons 2 into the cylinders.

As shown in this instance, the connecting rods 3 are provided with balls 4 at one end pivotally held within the one piece sockets 6 formed in the rearwardly extending integral portions 5 of the piston heads, the edges of the sockets being crimped or formed over to hold the balls. The crank ends of the connecting rods 3 are preferably formed with continuous rings 8 adapted to be slipped over the bearing sleeves 16 in assembling the unitary structure comprising the pistons, connecting rods and crank.

In order to afford provision for assembling the pistons in the machine after the connecting rods have been connected to the same crank pin 15, in one form of the invention, portions of the ball sockets 6 are cut away at one side as indicated at 9 to allow one connecting rod 3 to rock over at that side until it touches or nearly touches the outer rim of the piston as indicated at the point 17 in Fig. 1. By cutting away the sockets 6 at a point at one side only, the desired result is accomplished without weakening the ball and socket connection. This construction permits the opposite piston 2 to swing past the edge of the cylinder casting and enter its piston bore. In Fig. 1 the pistons are shown in the positions they assume as they are being assembled in the cylinders, from which it will be apparent that the connecting rods 3 have been adjusted at an angle less than the angle between the axes of the cylinders. Such adjustment is permitted because of the cutaway portions 9 of the ball sockets and by this means either piston 2 may be inserted in a cylinder first, and the other piston follows into the other cylinder, so that the pistons are successively inserted in the cylinders after the connecting rods have been assembled in the pistons and on the same crank pin 15.

I am not to be understood as limiting the invention to the exact form and construction shown as equivalent constructions may be devised within the scope of my claims.

I claim:

1. A piston and connecting rod construction for engines comprising a hollow piston having an interior one piece socket formed in a rearwardly extending integral portion of the piston head, and a connecting rod having a ball at one end pivotally held within said socket, the edges of the socket being crimped or formed over to hold the ball and a portion of the ball socket being cut away at one side to permit the connecting rod to rock over at that side until it substantially touches the outer rim of the hollow piston, to afford provision for assembling a plurality of pistons as a unit in an engine after the connecting rods have been connected to the same crank pin.

2. A piston and connecting rod construction for engines comprising a hollow piston having an interior socket formed in a rearwardly extending portion of the piston head, and a connecting rod having a ball at one end pivotally held within said socket, a portion of the ball socket being cut away at one side to permit the connecting rod to rock over at that side until it substantially touches the outer rim of the hollow piston, to afford provision for assembling a plurality of pistons as a unit in an engine after the connecting rods have been connected to the same crank pin.

In testimony whereof, I have hereunto set my hand.

ROBERT A. LUNDELL.